(12) United States Patent
Domazakis

(10) Patent No.: US 9,011,957 B2
(45) Date of Patent: Apr. 21, 2015

(54) METHOD FOR THE PREPARATION OF OIL-CONTAINING MEAT-BASED PRODUCTS COMPRISING A REDUCED AMOUNT OF ADDITIVES

(71) Applicant: Emmanouil Domazakis, Rethymnon (GR)

(72) Inventor: Emmanouil Domazakis, Rethymnon (GR)

(73) Assignee: Creta Farm S.A., Rethymnon (GR)

( * ) Notice: Subject to any disclaimer, the term of this patent is extended or adjusted under 35 U.S.C. 154(b) by 0 days.

(21) Appl. No.: 14/063,455

(22) Filed: Oct. 25, 2013

(65) Prior Publication Data

US 2014/0154386 A1    Jun. 5, 2014

Related U.S. Application Data

(63) Continuation of application No. 13/202,553, filed as application No. PCT/EP2010/054083 on Mar. 29, 2010, now abandoned.

(30) Foreign Application Priority Data

Jun. 16, 2009  (EP) .................................... 09386015
Oct. 27, 2009  (EP) .................................... 09174201

(51) Int. Cl.
```
A23L 1/317    (2006.01)
A23B 4/08     (2006.01)
A23L 1/314    (2006.01)
A23L 1/315    (2006.01)
A23L 1/325    (2006.01)
```

(52) U.S. Cl.
CPC . *A23L 1/317* (2013.01); *A23B 4/08* (2013.01); *A23L 1/31454* (2013.01); *A23L 1/3152* (2013.01); *A23L 1/3175* (2013.01); *A23L 1/3177* (2013.01); *A23L 1/3255* (2013.01)

(58) Field of Classification Search
USPC .............................................. 426/7, 59, 574
See application file for complete search history.

(56) References Cited

U.S. PATENT DOCUMENTS

| | | | |
|---|---|---|---|
| 4,904,496 A | 2/1990 | Izzo et al. | |
| 5,286,513 A | 2/1994 | Fuisz | |
| 5,427,804 A | 6/1995 | Fuisz | |

FOREIGN PATENT DOCUMENTS

| | | |
|---|---|---|
| EP | 0325315 A1 | 7/1989 |
| WO | 2005094617 A1 | 10/2005 |

OTHER PUBLICATIONS

Morrison, G.S., et al., Relationship Between Composition and Stability of Sausage-Type Emulsions, Journal of Food Science, 36:426-430: 1971.

*Primary Examiner* — Michelle L Jacobson
*Assistant Examiner* — Bhaskar Mukhopadhyay
(74) *Attorney, Agent, or Firm* — McCarter & English, LLP; Steven G. Davis

(57) ABSTRACT

The present invention relates to oil-containing meal-based products, preferably emulsion-type meat-based products, minced or coarsely comminuted meal-based products, pale and fresh (raw) sausages, comprising besides the standard ingredients commonly foreseen for the particular meat-based products a reduced amount of additives selected from emulsifying agents, stabilizing agents and/or thickening agents. Preferably, the oil-containing meat-based products of the present invention contain a maximum of only one single additive selected from emulsifying agents, stabilizing agents and/or thickening agents. More preferably, the meat-based products of the present invention contain no additives, i.e. no emulsifying agents, no stabilizing agents and no thickening agents. Moreover, the present invention pertains to a process for preparing said oil-containing meat-based products.

19 Claims, 1 Drawing Sheet

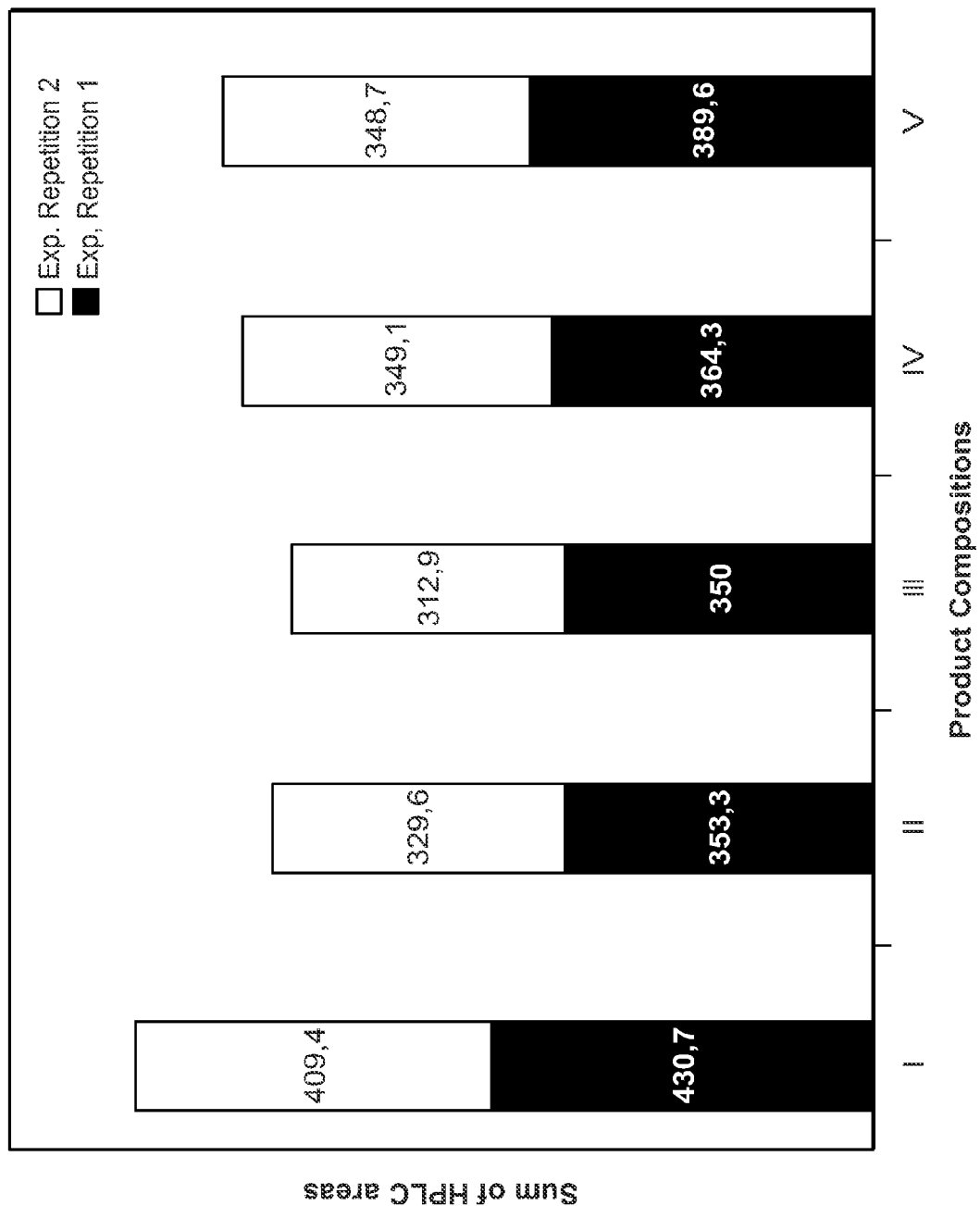

METHOD FOR THE PREPARATION OF OIL-CONTAINING MEAT-BASED PRODUCTS COMPRISING A REDUCED AMOUNT OF ADDITIVES

RELATED APPLICATIONS

This application is a Continuation of U.S. application Ser. No. 13/202,553, which is the U.S. National Stage of PCT/EP2010/054083, filed Mar. 29, 2010, which claims the benefit of EP Application No. 09386015.3, filed on Jun. 16, 2009 and EP Application No.: 09174201.5, filed on Oct. 27, 2009. The entire teachings of the each application are incorporated herein by reference.

The present invention relates to oil-containing meat-based products, preferably emulsion-type meat-based products, minced or coarsely comminuted meat-based products, pâté and fresh (raw) sausages, comprising besides the standard ingredients commonly foreseen for the particular meat-based products a reduced amount of additives selected from emulsifying agents, stabilizing agents and/or thickening agents. Preferably, the oil-containing meat-based products of the present invention contain a maximum of only one single additive selected from emulsifying agents, stabilizing agents and/or thickening agents. More preferably, the meat-based products of the present invention contain no additives, i.e. no emulsifying agents, no stabilizing agents and no thickening agents. Moreover, the present invention pertains to a process for preparing said oil-containing meat-based products.

Food products, and in particular meat-based products containing an edible oil, in particular an edible vegetable oil, in substitution of animal fat are desirable from a diet/health point of view as they have a lower cholesterol content and a higher ratio of unsaturated to saturated fatty acids. Basically, such meat-based products are prepared according to different methodologies using standard ingredients, such as meat, table salt or replacers thereof, water, nitrite salts (if applicable), natural nitrate sources (if applicable), spices, herbs, etc., as well as different food additives, such as emulsifying agents, stabilizing agents, thickening agents, etc., in order to obtain the stability and the intended organoleptic properties of the particular meat based products.

Food additives, such as those commonly used in the preparation of meat-based products, are substances added to food to preserve or enhance the quality characteristics of the foodstuff as well as to facilitate its processing. The use of additives may considerably improve the stability, texture and organoleptic properties of the foodstuff. Furthermore, the use of additives may reduce the total costs of foodstuff making.

In nowadays, there is an increasing consumer interest for food products with an improved health and nutritional profile. Foodstuffs, characterized by "low saturated fat" and "reduced additives", have attracted much of the consumer's attention. Moreover, food legislation is not uniform internationally. Different countries may exclude certain additives from specific food categories.

Regarding the preparation of oil-containing meat-based products, the properties of the meat system are dependent on the interactions between the protein fraction and other components of the meat system, namely the water and the lipid fraction. Incorporation of oils of high-unsaturated fatty acid content that are liquid at room temperature, such as vegetable oils, in meat emulsion systems often generates undesirable quality characteristics and stability problems. Thus, the prior art has adopted a number of approaches to improve the acceptability of oil-containing meat-based products. Bloukas et al. (Meat Science, Vol. 45, No. 2, pp. 133-144, 1997), for example, uses olive oil as a pre-emulsified fat (PEF) with soya protein isolate. On the other hand, Dubanchet (U.S. Pat. No. 5,238,701) teaches the use of a homogenous mixture made by incorporating milk proteins into hot oil in order to avoid exudation. To ensure stability in meat-based products with non pre-emulsified olive oil (i.e. olive oil addition by direct cold incorporation), the use of protein powder additives (e.g., of milk and vegetable origin), polyphosphates and starch, along with additional techniques (such as the use of vacuum) is strongly recommended to reduce the risk of oil exudation and/or stability problems.

An object of the present invention is, therefore, the provision of a novel methodology for preparing oil-containing meat-based products, comprising a reduced amount of additives selected from emulsifying agents, stabilizing agents and/or thickening agents, that enables a sufficiently stable oil incorporation into the food products and superior organoleptic properties of the end products. Thus, the consumer's desire for food products with an improved health and nutritional profile would be met and "cleaner" food label requirements would be satisfied.

This object is solved by a method for the preparation of oil-containing meat-based products according to claims 1-12, which is based on a multi-step addition of the oil to the meat mass, and the corresponding oil-containing meat-based products according to claims 13-16.

Thus, according to a first aspect, the present invention relates to a method for the preparation of oil-containing meat-based products, characterized in that a maximum of one additive selected from the group consisting of emulsifying agents, stabilizing agents and thickening agents is added during the preparation of the oil-containing meat-based products, wherein the method is based on a multi-step addition of the oil.

By the use of a multi-step oil addition protocol, it is possible to sufficiently stably incorporate an edible oil in the maximum technologically feasible quantity into meat-based products, comprising a maximum of only one additive selected from the group consisting of emulsifying agents, stabilizing agents and thickening agents, without the occurrence of oil exudation due to phase separation. The use of a combination of various additives or processing aids, such as emulsifying agents, stabilizing agents and thickening agents, in order to obtain a stable incorporation of the introduced oil, is therefore no longer necessary. Thus, the consumer's desire for food products with an improved health and nutritional profile could be met and "cleaner" food label requirements could be satisfied. Moreover, the organoleptic, dietetic and nutritional properties of the oil can be directly transferred to the meat-based products by using the method of the invention. For instance, in the case of cooked olive oil-containing meat-based products, it has been found that specific olive oil phenolic compounds, such as hydroxytyrosol, tyrosol, 1-acetoxy pinoresinol, decarboxylated aglycone of oleuropein, luteolin and oleuropein aglycone dialdehyde, could be maintained in the meat-based products prepared according to the present invention, using a maximum of one additive selected from the group consisting of emulsifying agents, stabilizing agents and thickening agents. High levels of specific olive oil phenolic compounds could be maintained in the meat-based products prepared according to the present invention, when no additive selected from the group consisting of emulsifying agents, stabilizing agents and thickening agents was used, while especially high levels of specific olive oil phenolics compounds could be obtained, when soya protein isolate was used as additive selected from the group consisting of emulsifying agents, stabilizing agents and thickening agents.

According to the present invention, the oil-containing meat-based products prepared according to the method of the invention are preferably selected from the group consisting of emulsion-type meat-based products, minced or coarsely comminuted meat-based products, pâté and fresh (raw) sausages. However, any other oil-containing meat-based product, not specifically mentioned above, is also encompassed by the present application in case it may be prepared by the method of the invention.

Within the context of the present invention, the term "emulsion-type meat-based products" or "cooked sausages", whenever used herein, comprises any emulsion-type meat-based product or cooked sausage, preferably selected from the group consisting of frankfurters, parizers, mortadella, bierwurst, bratwurst-type sausages, country sausages, etc. The term "minced or coarsely comminuted meat-based products", whenever used herein, comprises any minced or coarsely comminuted meat-based product, preferably selected from the group consisting of döner kebab, meat balls, burger patties, etc. Moreover, the term "pâté", whenever used herein, comprises any pâté, preferably selected from the group consisting of pâté, pâtéde campagne, pâtéardennais, confit de foie, etc. Further, the term "fresh (raw) sausages", whenever used herein, comprises any fresh (raw) sausage, preferably selected from the group consisting of Bratwurst-type, Longaniza-type, Chorizo-type, Breakfast sausages-type, etc.

Preferably, the oil-containing meat-based products prepared according to the method of the invention contain the edible oil as substitute for the animal fat commonly added in the above-mentioned meat-based products. The meat-based products prepared according to the method of the invention may, however, also contain both edible oil and animal fat.

Within the context of the present invention, the term "oil", whenever used herein, comprises any edible oil fit for human consumption. Preferably, the oil used according to the present invention is an edible vegetable oil. Some of the many different kinds of edible vegetable oils, that can be used according to the present invention, include: olive oil, palm oil, soybean oil, canola oil, pumpkin seed oil, corn oil, rape oil, sunflower oil, safflower oil, peanut oil, walnut oil, wheat germ oil, grape seed oil, sesame oil, argan oil, rice bran oil and mixtures thereof. Many other kinds of vegetable oils that are used for cooking can, however, also be used according to the present application. From the oils mentioned above, olive oil, sunflower oil, corn oil, rape oil and mixtures thereof are especially preferred, with olive oil being the most preferred oil. Especially preferred, the oil is virgin olive oil or extra virgin olive oil. Moreover, it is also preferred that the oil used according to the present application is an organic oil.

The amount of the oil, that is to be used for the preparation of the oil-containing meat-based products, particularly depends on the kind of oil, the kind of meat as well as on the intended oil end concentration of the meat-based products to be prepared. An exemplary amount of the oil is between 1 and 35 wt.-%, preferably between 2 and 30 wt.-%, more preferably between 3 and 20 wt.-% and most preferably between 4 and 15 wt.-%. In particular, the oil end concentration of the meat-based products thus prepared ranges from 1 to 35 wt.-%, preferably 2 to 20 wt.-%, more preferably 2 to 15 wt.-% and most preferably 4 to 15 wt.-%.

According to the present invention, the oil is incorporated into the meat-based products by direct addition following a multi-step oil addition protocol. This is to say, the amount of the oil, that is to be used for the preparation of the oil-containing meat-based products, is subdivided into different portions, having either the same or different sizes, and is added in multiple steps to the meat mass, wherein a single oil addition step starts with the addition of an appropriate portion of the oil to be added and ends when the whole amount of the portion of oil is fully incorporated into the meat mass, and wherein a subsequent oil addition step does not start until the preceding oil addition step is finished. This multi-step addition of the oil enables a stable incorporation of the oil in the maximum technologically feasible quantity into the meat-based products prepared according to the method of the invention and, thus, allows for the use of a reduced amount of additives and processing aids, such as emulsifying agents, stabilizing agents and thickening agents.

Preferably, the oil is added by direct addition following a four-step addition protocol, a three-step addition protocol or a two-step addition protocol, wherein a two-step addition of the oil is most preferred.

According to the present invention, the oil-containing meat-based products prepared according to the method of the invention contain a maximum of only one additive selected from the group consisting of emulsifying agents, stabilizing agents and thickening agents. Within the context of the present invention, the term "emulsifying agents", whenever used herein, comprises any emulsifying agent commonly used for food preparations such as meat-based products. Preferably, the emulsifying agent is selected from the group consisting of foreign proteins, such as a vegetable protein, e.g. soya protein or soya protein isolate (SPI), or a milk protein, e.g. sodium caseinate, lecithin, mono- and diglycerides of fatty acids, etc. The term "stabilizing agents", whenever used herein, comprises any stabilising agent commonly used for food preparations such as meat-based products. Preferably, the stabilizing agent is selected from the group consisting of a phosphate salt or a phosphate salt mixture, such as a diphosphate, a triphosphate, a tripolyphosphate or a polyphosphate or any mixture thereof. Moreover, the term "thickening agents", whenever used herein, comprises any thickening agent commonly used for food preparations such as meat-based products. Preferably, the thickening agent is selected from the group consisting of polysaccharides or proteins, such as starches, e.g. wheat starch or corn starch, carrageenan, locust bean gum, collagen and derivatives thereof, etc.

Preferably, the maximum of one additive selected from the group consisting of emulsifying agents, stabilizing agents and thickening agents is a foreign protein, such as a vegetable protein, e.g. soya protein or soya protein isolate (SPI), or a milk protein, e.g. sodium caseinate, a phosphate salt or phosphate salt mixture, such as a diphosphate, a triphosphate, a tripolyphosphate, a polyphosphate or any mixture thereof, or a polysaccharide, such as a starch, e.g. wheat starch. More preferably, the maximum of one additive selected from the group consisting of emulsifying agents, stabilizing agents and thickening agents is soya protein isolate, sodium caseinate, a phosphate salt or phosphate salt mixture, or a starch, with soya protein isolate being most preferred. Most preferably, the method of the invention uses no additives selected from the group consisting of emulsifying agents, stabilizing agents and thickening agents, i.e. no emulsifying agent, no stabilizing agent and no thickening agent.

According to the present application, the maximum of only one additive selected from the group consisting of emulsifying agents, stabilizing agents and thickening agents may be added at any process step during the preparation of the meat mass. This is to say, that the maximum of only one additive selected from the group consisting of emulsifying agents, stabilizing agents and thickening agents may be added prior to the commencement of the multi-step addition of the oil, between individual steps of the multi-step addition of the olive oil, within individual steps of the multi-sep addition of the oil or upon completion of the multi-step addition of the oil. Preferably, the maximum of only one additive selected from the group consisting of emulsifying agents, stabilizing agents and thickening agents is added prior to the commencement of the multi-step addition of the oil or between individual steps of the multi-step addition of the oil or within an individual step of the multi-step addition of the oil, i.e. together with a portion of the oil to be added.

Besides the maximum of only one additive selected from the group consisting of emulsifying agents, stabilizing agents and thickening agents, the oil-containing meat-based products prepared according to the method of the invention comprise the standard ingredients commonly used in the art for preparing emulsion-type meat-based products, minced or coarsely comminuted meat-based products, pâté and fresh (raw) sausages. Preferably, the oil-containing meat-based products of the present invention comprise meat, water/ice, salts, e.g. nitrite salts (if applicable), table salt or table salt replacers (e.g. KCl), natural nitrate sources (if applicable), a maximum of only one additive selected from the group consisting of emulsifying agents, stabilizing agents and thickening agents, and optionally at least one additional ingredient selected from the group consisting of spices, herbs, vegetables, fruits, nuts, microbial cultures, sugars, pieces of fatty tissue and pieces of meat tissue. Within the context of the present invention, the term "meat", as used herein, comprises any kind of meat or fish commonly used for food preparations such as meat-based products. Preferably, the term "meat" encompasses any kind of beef meat, pork meat, poultry meat, such as chicken meat, turkey meat, canard meat or goose meat, veal meat, game meat or fish meat, such as shellfish meat, haddock meat, salmon meat, cod meat and tuna meat. Moreover, it is preferred that the meat used according to the method of the invention is lean meat, i.e. meat having a fat content of up to 10 wt.-%, preferably of up to 8 wt.-%, more preferably of up to 5 wt.-% and most preferably of up to 3 wt.-%.

In a preferred embodiment of the invention, the method of the present invention is based on a two-step addition of the oil and comprises the steps of:
(i) mixing comminuted meat with NaCl or replacers thereof, and water/ice in an appropriate mixing machine,
(ii) adding a first portion of oil, representing 40-80% by weight of the overall amount of the oil to be added during the preparation of the oil-containing meat-based products, to the mixture of (i), and further mixing the resulting mixture,
(iii) adding a second portion of oil, representing 60-20% by weight of the overall amount of the oil to be added during the preparation of the oil-containing meat-based products, to the mixture of (ii), and further mixing the resulting mixture,
(iv) filling the mixture of step (iii) in stuffing or canning materials, or forming the mixture of step (iii) into a desirable shape,
(v) (v.1) subjecting the stuffed or canned or formed mixture to a heat treatment or curing treatment, and/or
(v.2) chilling or freezing the stuffed or canned or formed mixture and packaging the final product,
wherein the maximum of one additive selected from the group consisting of emulsifying agents, stabilizing agents and thickening agents is added in steps (i), (ii) or (iii).

In step (i) of the above-described method, meat, preferably lean meat, is comminuted and mixed with NaCl or replacers thereof, optionally nitrite salts (wherever necessary), and water/ice in an appropriate mixing machine. The term "lean meat", used in this context, refers to meat having a fat content of up to 10 wt.-%, preferably of up to 8 wt.-%, more preferably of up to 5 wt.-% and most preferably of up to 3 wt.-%. Preferably, the meat is selected from any kind of beef meat, pork meat, poultry meat, such as chicken meat, turkey meat, canard meat or goose meat, veal meat, game meat or fish meat, such as shellfish meat, haddock meat, salmon meat, cod meat and tuna meat.

According to the present invention, step (i) of the above-described method is conducted according to conventional procedures known in the art for the preparation of finely or coarsely comminuted meat masses or meat pastes suited for the preparation of emulsion-type meat-based products, minced or coarsely comminuted meat-based products, pâté and fresh (raw) sausages. An exemplary method for performing step (i) of the above-described method is the following: Lean meat is finely or coarsely comminuted and mixed with NaCl or replacers thereof and optionally nitrite salts inside the bowl of a cutter or mixer with successive addition and mixing of water/ice until a homogenous mixture is achieved. Alternatively, lean meat is finely or coarsely comminuted in the presence of NaCl or replacers thereof and optionally nitrite salts inside the bowl of a cutter with successive addition and mixing of water/ice until a homogenous mixture is achieved.

According to the present invention, it is preferred that the temperature of the mixture during step (i) does not exceed 16, 15, 14, 13, 12, 11, 10, 9, 8, 7, 6, 5, or 4° C., respectively. More preferred, the temperature of the mixture during step (i) does not exceed 8, 7, 6, 5, or 4° C., respectively. Most preferred, the temperature of the mixture during step (i) does not exceed 6, 5, or 4° C., respectively, with 4° C. being especially preferred.

Moreover, it is preferred that the mixing rate during step (i) of the above-described method is kept low.

In step (ii) of the above-described method (first step of the two-step oil addition protocol), a first portion of oil, representing 40-80% by weight, preferably 50-70% by weight and most preferably 55-65% by weight of the overall amount of the oil to be added during the preparation of the oil-containing meat-based products, is added to the mixture of (i). The resulting mixture is further mixed until the full incorporation of the first portion of the oil.

According to the present invention, step (ii) of the above-described method is conducted according to conventional procedures known in the art for the preparation of finely or coarsely comminuted meat masses or meat pastes suited for the preparation of emulsion-type meat-based products, minced or coarsely comminuted meat-based products, pâté and fresh (raw) sausages. An exemplary method for performing step (ii) of the above-described method is the following: Adding an appropriate portion of oil to the finely or coarsely comminuted meat mass of step (i), comprising meat, NaCl or replacers thereof, nitrite salts (if applicable) and water/ice and further mixing the resulting mixture until the full incorporation of the oil into the meat mass.

According to the present invention, it is preferred that the temperature of the mixture during step (ii) does not exceed 16, 15, 14, 13, 12, 11, 10, 9, 8, 7, 6, 5, or 4° C., respectively. More preferred, the temperature of the mixture during step (ii) does not exceed 8, 7, 6, 5, or 4° C., respectively. Most preferred, the temperature of the mixture during step (ii) does not exceed 6, 5, or 4° C., respectively, with 4° C. being especially preferred.

Moreover, it is preferred that the mixing rate during step (ii) of the above-described method is kept high.

In step (iii) of the above-described method (second step of the two-step oil addition protocol), a second portion of oil, representing 60-20% by weight, preferably 50-30% by weight and most preferably 45-35% by weight of the overall amount of the oil to be added during the preparation of the oil-containing meat-based products, is added to the mixture of (ii). The resulting mixture is further mixed until the full incorporation of the second portion of the oil.

According to the present invention, step (iii) of the above-described method is conducted according to conventional procedures known in the art for the preparation of finely or coarsely comminuted meat masses or meat pastes suited for the preparation of emulsion-type meat-based products, minced or coarsely comminuted meat-based products, pâté and fresh (raw) sausages. An exemplary method for performing step (iii) of the above-described method is the following: Adding an appropriate portion of oil to the finely or coarsely comminuted meat mass of step (ii), comprising meat, NaCl or replacers thereof, nitrite salts (if applicable), water/ice and a first portion of oil and further mixing the resulting mixture until the full incorporation of the second portion of oil into the meat mass.

According to the present invention, it is preferred that the end temperature of the mixture of step (iii) is between 4 and 20° C. Preferably, the end temperature of the mixture of step (iii) is 4, 5, 6, 7, 8, 9, 10, 11, 12, 13, 14, 15, 16, 17, 18, 19 or 20° C. More preferably, the end temperature of the mixture of step (iii) is 4, 5, 6, 7, 8, 9, 10, 11 or 12° C. Most preferably, the end temperature of the mixture of step (iii) is 4, 5, 6, 7 or 8° C. For pâté-type products, it is especially preferred that the end temperature of the mixture of step (iii) is 18, 19 or 20° C.

Moreover, it is preferred that the mixing rate during step (iii) of the above-described method is kept high.

In step (iv) of the above-described method, the mixture of step (iii) is filled in stuffing or canning materials, or is forming into a desirable shape. Optionally, the mixture of step (iii) is also breaded after being formed into a desirable shape. According to the present invention, step (iv) is conducted according to conventional procedures known in the art for the preparation of emulsion-type meat-based products, minced or coarsely comminuted meat-based products, pâté and fresh (raw) sausages.

Further, in step (v) of the above-describes method, the stuffed or canned or formed mixture of step (iv) is (v.1) subjected to a heat treatment, and/or is (v.2) chilled or frozen and packaged. According to the present invention, step (v) is conducted according to conventional procedures known in the art for the preparation of emulsion-type meat-based products, minced or coarsely comminuted meat-based products, pâté and fresh (raw) sausages. Preferably, the heat treatment is a thermal process at least equivalent to pasteurization or sterilization.

According to the present invention, the maximum of one additive selected from the group consisting of emulsifying agents, stabilizing agents and thickening agents is added in steps (i), (ii) or (iii) of the above-described method. Preferably, the maximum of one additive selected from the group consisting of emulsifying agents, stabilizing agents and thickening agents is added in step (i). If the maximum of one additive selected from the group consisting of emulsifying agents, stabilizing agents and thickening agents is a thickening agent, it is, however, especially preferred that the thickening agent is added during or at the end of step (iii). Moreover, within the context of the present invention, it is, however, also possible to add the maximum of one additive selected from the group consisting of emulsifying agents, stabilizing agents and thickening agents in an additional mixing step following step (iii).

According to an especially preferred embodiment of the method of the invention, no additives selected from the group consisting of emulsifying agents, stabilizing agents and thickening agents are added during the preparation of the oil-containing meat-based products, i.e. no emulsifying agent, no stabilizing agent and no thickening agent.

Moreover, it is also preferred that optionally at least one additional ingredient selected from the group consisting of vegetables, spices, fruits, nuts, herbs, microbial cultures, sugars, pieces of fatty tissue and pieces of meat tissue is added during the above-described method. The at least one additional ingredient selected from the group consisting of vegetables, spices, fruits, nuts, herbs, microbial cultures, sugars, pieces of fatty tissue and pieces of meat tissue is preferably added in steps (i), (ii) or (iii). More preferred, the at least one additional ingredient selected from the group consisting of vegetables, spices, herbs, fruits, nuts, microbial cultures, sugars, pieces of fatty tissue and pieces of meat tissue is added in step (iii). Especially preferred, the at least one additional ingredient selected from the group consisting of vegetables, spices; herbs, fruits, nuts, microbial cultures, sugars, pieces of fatty tissue and pieces of meat tissue is added at the end of step (iii). Moreover, within the context of the present invention, it is, however, also possible to add the at least one additional ingredient selected from the group consisting of vegetables, spices, herbs, fruits, nuts, microbial cultures, sugars, pieces of fatty tissue and pieces of meat tissue in an additional mixing step following step (iii).

Appropriate amounts of the different ingredients used according to the method of the invention, such as meat, nitrite salt, NaCl or replacers thereof, water/ice, oil, emulsifying agent, stabilizing agent or thickening agent, vegetables, spices, fruits, nuts, herbs, microbial cultures, sugars, pieces of fatty tissue and pieces of meat tissue, are standard amounts commonly used in the art for preparing meat-based products, such as emulsion-type meat-based products, minced or coarsely comminuted meat-based products, pâté and fresh (raw) sausages and could be easily determined by the average skilled person.

An example of a preferred method for the preparation of oil-containing meat-based products according to the invention that is based on a two-step addition of the oil is the following:

Finely or coarsely comminuted or minced edible meat, preferably at a temperature of −2° C., is subjected to a first mixing cycle together with a combination of curing salts and table salt to facilitate the extraction of the salt-soluble meat proteins, preferably until an overall mixture temperature of <4° C. is achieved, whereas a temperature of <5, 6, 7, 8, 9, 10, 11, 12, 13, 14, 15, or 16° C. may also be used. The addition of ice water during the first mixing cycle regulates, for example, the overall mixture temperature as well as facilitates the extraction of the meat proteins. The first mixing cycle preferably also serves for admixing the maximum of one additive selected from the group consisting of emulsifying agents, stabilizing agents and thickening agents, if necessary, depending on the intended texture of the resulting product. The mixing rate during the first mixing cycle is preferably kept low.

Then, an oil quantity equal to 40-80% of the total oil to be added is mixed therein (first step of the two-step olive oil addition), signalling the beginning of the second mixing cycle that continues until the full incorporation of the added oil portion. The second mixing cycle is preferably performed at an ice-regulated overall mixture temperature of <4° C. and under high speed mixing rate, whereas a temperature of <5, 6, 7, 8, 9, 10, 11, 12, 13, 14, 15, or 16° C. may also be used.

Following this, the third mixing cycle begins with the admixture of flavourings and antioxidants, if required. During the third mixing cycle, the remaining 60-20% of the total oil quantity to be added is added to the resulting meat mass using a high speed mixing rate (second step of the two-step olive oil addition). The mixing is continued until the full incorporation of the second portion of oil and the resulting product mixture preferably reaches a temperature of 4° C., whereas a temperature of <5, 6, 7, 8, 9, 10, 11, 12, 13, 14, 15, or 16° C. may also be used.

Preferably, in an additional mixing cycle following step (iii), the mixing speed rate is kept low, while pieces of fatty tissue and/or meat tissue (as foreseen, e.g., in the manufacturing of specific product types, such as mortadella and bierwurst) and/or vegetables and/or fruits and/or nuts and/or microbial cultures may be added, depending on the particular kind of meat-based product that is to be prepared. When using a thickening agent as the maximum of one additive selected from the group consisting of emulsifying agents, stabilizing agents and thickening agents, it is preferred that the thickening agent is added within this additional cycle. The mixing is continued and the resulting product mixture temperature should preferably be kept <4° C., whereas <5, 6, 7, 8, 9, 10, 11, 12, 13, 14, 15, 16, 17, 18, 19 or 20° C. may also be used. Due to the conventionally higher temperature ranges adopted, e.g., in the making of pâté-type products, the overall mixture temperature during the preparation of a pâté is progressively increased in this mixing cycle to reach a temperature range of approximately 20° C. at the end of this cycle.

Finally, the resulting product mixture is (i) stuffed in natural or artificial casings, thermally processed (e.g., pasteurized, i.e. following a thermal process equivalent to pasteurisation) and/or smoked, and chilled or frozen and packaged, (ii) canned and thermally processed (e.g., sterilized, i.e. following a thermal process equivalent to sterilization), and optionally chilled, and packaged, (iii) formed, thermally processed (e.g., pasteurized, i.e. following a thermal process equivalent to pasteurisation), and chilled or frozen, and packaged, (iv) stuffed in natural or artificial casings, and chilled or frozen and packaged, or (v) formed, and chilled or frozen and packaged.

Further examples of a preferred method for the preparation of oil-containing meat-based products according to the invention are disclosed in Examples 1, 2 and 3.

According to another aspect, the present invention relates to an oil-containing meat-based product, comprising a maximum of one additive selected from the group consisting of emulsifying agents, stabilizing agents and thickening agents. Preferably, the oil-containing meat-based product is selected from the group consisting of emulsion-type meat-based products, minced or coarsely comminuted meat-based products, pâté and fresh (raw) sausages. However, any other oil-containing meat-based product, not specifically mentioned, is also encompassed by the present application.

According to the present invention, the oil-containing meat-based product contains the oil as substitute for the animal fat commonly added in the above-mentioned meat-based products. The meat-based product may, however, also contain both edible oil and animal fat.

The amount of the oil contained in the oil-containing meat-based product particularly depends on the kind of oil, the kind of meat as well as on the intended oil end concentration of the particular meat-based product. An exemplary oil end concentration ranges from 1 to 35 wt.-%, preferably 2 to 20 wt.-%, more preferably 2 to 15 wt.-% and most preferably 4 to 15 wt.-%.

According to the present invention, the oil-containing meat-based product contains a maximum of only one additive selected from the group consisting of emulsifying agents, stabilizing agents and thickening agents. Preferably, the maximum of one additive selected from the group consisting of emulsifying agents, stabilizing agents and thickening agents is a foreign protein, such as a vegetable protein, e.g. soya protein or soya protein isolate (SPI), or a milk protein, e.g. sodium caseinate, a phosphate salt or phosphate salt mixture, such as a diphosphate, a triphosphate, a tripolyphosphate, a polyphosphate or any mixture thereof, or a polysaccharide, such as a starch, e.g. wheat starch. More preferably, the maximum of one additive selected from the group consisting of emulsifying agents, stabilizing agents and thickening agents is soya protein isolate, sodium caseinate, a phosphate salt or phosphate salt mixture, or a starch, with soya protein isolate being most preferred. Especially preferred, the oil-containing meat-based product of the invention contains no additive selected from the group consisting of emulsifying agents, stabilizing agents and thickening agents, i.e. no emulsifying agent, no stabilizing agent and no thickening agent.

According to a preferred embodiment of the present invention, the oil-containing meat-based product is obtainable according to the above-described method of the invention.

The present invention will now be further illustrated by the following FIGURE and examples.

FIGURE

FIG. 1 is a graph showing the sum of HPLC peak areas of olive oil phenolic markers for each of the following product compositions tested:
Product composition I: standard ingredients, plus soya protein isolate (SPI).
Product composition II: standard ingredients, plus proteins of milk origin (PMO),
Product composition III: standard ingredients, plus wheat starch,
Product composition IV: standard ingredients, plus phosphates.
Product composition V: only standard ingredients, no additive.

EXAMPLES

Example 1

Preparation of Different Olive Oil-Containing Pâté Products

Example 1 shows a comparison of two olive oil-containing pâté-type products 1 and 2, comprising standard ingredients and a phosphate salt mixture as the maximum of one additive selected from the group consisting of emulsifying agents, stabilizing agents and thickening agents, wherein the olive oil has been incorporated using a one-step addition protocol (not an embodiment of the present application) and a multi-step addition protocol, namely a two-step protocol according to the present invention. The ingredients used for making both pâté-type products are shown in Table 1 below.

TABLE 1

| Ingredients | Concentration (wt.-%) |
|---|---|
| Pork liver tissue | 50.0 |
| Curing salt | 2.0 |
| Phosphates | 0.4 |
| Water | 15.6 |
| Virgin olive oil | 30.0 |
| Sugars | 2.0 |

A two-step addition of olive oil was adopted in case of pâté 1, whereby 70% of the total olive oil quantity were added at the beginning of the second mixing cycle and the remaining 30% of olive oil were added during the third mixing cycle. For pâté 2, the total quantity of olive oil was added at the beginning of the second mixing cycle. The resulting mixture was stuffed in plastic casings and was thermally processed following a thermal process equivalent to pasteurization, preferably until the core temperature reached 72° C. The encased resulting products were then rapidly chilled down using known technologies until a core temperature of <6° C. was reached. The stuffed products were then kept at 4° C. until use.

On the day of analysis, 100 g of each olive oil-containing pâté (pâté 1 and 2) were cut in cubes (0.5×0.5×0.5 cm) and centrifuged at 12,000 rpm for 15 min at room temperature. The resulting quantities (g) of exudated liquid material (i.e. oil and water) were as shown in Table 2.

TABLE 2

|  | Exudated material (g) | H$_2$O (g) | Oil (g) |
| --- | --- | --- | --- |
| Pâté 1 | 8.84 | 7.49 | 1.35 |
| Pâté 2 | 10.94 | 8.47 | 2.47 |

As can be seen from Table 2, the use of a multi-step oil addition, as provided by the present application, enables the stable introduction of an edible oil in the maximum technologically feasible quantity into meat-based products, comprising only a maximum of one additive selected from the group consisting of emulsifying agents, stabilizing agents and thickening agents and at least one additional ingredient selected from the group consisting of spices, herbs, vegetables, fruits, nuts, microbial cultures, sugars, pieces of fatty tissue and pieces of meat tissue.

Example 2

Preparation of Different Olive Oil-Containing Emulsion-Type Meat-Based Products

Five extra virgin olive oil-containing parizer (parizer I-V), a Greek cooked emulsion-type meat-based product, were prepared using the standard ingredients and a maximum of one additive selected from the group consisting of emulsifying agents, stabilizing agents and thickening agents. For a detailed listing of the individual ingredients contained in parizer I-V, see Table 3.

TABLE 3

| Product composition (wt.-%) | | | | | |
| --- | --- | --- | --- | --- | --- |
|  | Type I | Type II | Type III | Type IV | Type V |
| Pork meat | 56 | 56 | 56 | 56 | 56 |
| Extra virgin olive oil | 14.9 | 14.9 | 14.9 | 14.9 | 14.9 |
| Curing salt | 2 | 2 | 2 | 2 | 2 |
| Phosphates | 0 | 0 | 0 | 0.47 | 0 |
| Sugars | 1.20 | 1.20 | 1.20 | 1.20 | 1.20 |
| Soya protein isolate | 0.7 | 0 | 0 | 0 | 0 |
| Sodium ascorbate | 0.05 | 0.05 | 0.05 | 0.05 | 0.05 |
| Milk proteins | 0 | 0.9 | 0 | 0 | 0 |
| Wheat starch | 0 | 0 | 3.9 | 0 | 0 |
| Water | To adjust up to 100 wt.-% | | | | |

The different groups of parizer products I-V were prepared according to the method of the invention and were treated the same throughout the whole process of making and storage.

After encasing of the meat mass, the parizers I-V were thermally processed following a thermal process equivalent to pasteurization, preferably until a core temperature of 72° C. was reached. The encased resulting products were then rapidly chilled down to a core temperature of <6° C., using known technologies. Following this, the parizers I-V (310 g each) were kept at 4° C. until further use.

The parizers I-V were then HPLC analyzed to determine differences in their free olive oil polyphenol contents. This was demonstrated by the sum of HPLC peak areas of selected olive oil polyphenol markers (i.e. hydroxytyrosol, tyrosol, decarboxylated aglycone of oleuropein, 1-acetoxy pinoresinol, oleuropein aglycone dialdehyde, luteolin). For that, on the day of analysis, 10 g of each parizer I-V were homogenized using a Cyclone IQ2 VIRTIS homogeniser at 7,000 rpm in the presence of an appropriate extraction solvent. The whole procedure was done according to J. Agric. Food Chem. 34, 823-826, 1986. The selected free olive oil phenolic indicators were quantitatively estimated as areas of the respective LC chromatogram with peaks at 256 nm and 325 nm for luteolin only (see FIG. 1). The phenolic indicators hydroxytyrosol, tyrosol, decarboxylated aglycone of oleuropein, 1-acetoxy pinoresinol and luteolin were identified by LC-MS (ESI±) using a Thermo AQA single quadrupole spectrometer coupled to a Finnigan MAT Spectra System P4000 pump and a UV 6000LP diode array detector. These compounds were selected because they were easily tracked down through the complex profiles of the analyzed products. The routine analyses were performed on a Hewlett Packard 1090 series II HPLC with incorporated Diode Array Detector using a Synergi 4μ Hydro-RP 80A (250×4.6 mm) Phenomenex column. The results of the HPLC analysis are shown in FIG. 1.

As can be seen from FIG. 1, specific olive oil phenolic compounds, such as hydroxytyrosol, tyrosol, 1-acetoxy pinoresinol, decarboxylated aglycone of oleuropein, luteolin, oleuropein aglycone dialdehyde, can be maintained in the Greek cooked emulsion-type meat-based products prepared according to the method of the invention, using no additives or a maximum of one additive selected from the group consisting of emulsifying agents, stabilizing agents and thickening agents. Moreover, it can also been seen from FIG. 1, that the use of soya protein isolate as sole additive of the olive oil-containing meat-based products results in comparably higher levels of selected free olive oil phenolics. This is to say, the organoleptic, dietetic and especially the nutritional properties of the oil can be directly transferred to the meat-based products using the method of the invention.

Example 3

Preparation of Olive Oil-Containing Fresh (Raw) Sausages

Pork meat from pork legs of a temperature of approximately 0-2° C. was minced in an industrial angle grinder using a 4 mm hole plate and cross knife. Afterwards the meat was transferred into a mixing apparatus (K+G, 2001, paddle mixer). Then, table salt (12 g/kg of meat) and subsequently 50 wt.-% of the total amount of olive oil to be added (100 g/kg of meat; first step of olive oil addition) were added using preferably a low mixing speed for approximately 4 minutes. Then, sodium diphosphates (3 g/kg of meat) were added, while the mixing was continued until the full incorporation of the first part of the added olive oil, preferably at an ice-regulated overall mixture temperature of <4, 5 or 6° C. using a high speed mixing rate. Following this, a spice blend was added and the remaining 50 wt.-% of the olive oil were added (second step of olive oil addition). The mixing continued until the full incorporation of the second part of the added olive oil and the resulting product mixture preferably reached a temperature of <8, 9, 10, 11 or 12° C. Finally, the resulting product mixture was stuffed in natural or artificial casing and was chilled or frozen.

The invention claimed is:

1. A method for the preparation of oil-containing meat-based products, characterized in that no additive or a maximum of one additive is added during the preparation of the oil-containing meat-based products, wherein said additive is selected from the group consisting of emulsifying agents, stabilizing agents and thickening agents, and the oil is incorporated into the meat-based products by a two-step direct addition, wherein the method comprises the steps of:
 (i) mixing comminuted meat with NaCl or replacers thereof, and water/ice in an appropriate mixing machine,
 (ii) adding a first portion of oil, representing 55-80% by weight of the overall amount of the oil to be added during the preparation of the oil-containing meat-based products, to the mixture of (i), and further mixing the resulting mixture,
 (iii) adding a second portion of oil, representing 45-20% by weight of the overall amount of the oil to be added during the preparation of the oil-containing meat-based products, to the mixture of (ii), and further mixing the resulting mixture,
 (iv) filling the mixture of step (iii) in stuffing or canning materials, or forming the mixture of step (iii) into a desirable shape,
 (v) (v.1) subjecting the stuffed or canned or formed mixture to a heat treatment or curing treatment, and/or
  (v.2) chilling or freezing the stuffed or canned or formed mixture and packaging the final product,
 wherein the maximum of one additive selected from the group consisting of emulsifying agents, stabilizing agents and thickening agents is added in steps (i), (ii) or (iii), and
 wherein 1 to 35 wt % of the oil-containing meat-based product is oil.

2. The method of claim 1, wherein the temperature of the mixture in steps (i) and (ii) does not exceed 16° C.

3. The method of claim 1, wherein the temperature of the mixture in steps (i) and (ii) does not exceed 4° C.

4. The method of claim 1, wherein the maximum of one additive selected from the group consisting of emulsifying agents, stabilizing agents and thickening agents is added in step (i).

5. The method of claim 1, wherein no additives selected from the group consisting of emulsifying agents, stabilizing agents and thickening agents are added during the preparation of the oil-containing meat-based products.

6. The method of claim 1, wherein at least one additional ingredient selected from the group consisting of vegetables, spices, fruits, nuts, herbs, microbial cultures, sugars, pieces of fatty tissue and pieces of meat tissue is added in steps (i), (ii) or (iii).

7. The method of claim 6, wherein the at least one additional ingredient selected from the group consisting of vegetables, spices, herbs, fruits, nuts, microbial cultures, sugars, pieces of fatty tissue and pieces of meat tissue is added at the end of step (iii).

8. The method of claim 1, wherein the oil-containing meat-based products are selected from emulsion-type meat-based products, minced or coarsely comminuted meat-based products, pate and fresh (raw) sausages.

9. The method of claim 1, wherein the oil is a vegetable oil selected from olive oil, palm oil, soybean oil, canola oil, pumpkin seed oil, corn oil, rape oil, sunflower oil, safflower oil, peanut oil, walnut oil, wheat germ oil, grape seed oil, sesame oil, argan oil, rice bran oil and mixtures thereof.

10. The method of claim 1, wherein the meat is selected from the group consisting of beef meat, pork meat, poultry meat, such as chicken meat, turkey meat, canard meat or goose meat, veal meat, game meat and fish meat, such as shellfish meat, haddock meat, salmon meat, cod meat or tuna meat.

11. An oil-containing meat-based product, obtained according to the method of claim 1.

12. The method of claim 2, wherein the maximum of one additive selected from the group consisting of emulsifying agents, stabilizing agents and thickening agents is added in step (i).

13. The method of claim 3, wherein the maximum of one additive selected from the group consisting of emulsifying agents, stabilizing agents and thickening agents is added in step (i).

14. The method of claim 2, wherein no additives selected from the group consisting of emulsifying agents, stabilizing agents and thickening agents are added during the preparation of the oil-containing meat-based products.

15. The method of claim 3, wherein no additives selected from the group consisting of emulsifying agents, stabilizing agents and thickening agents are added during the preparation of the oil-containing meat-based products.

16. The method of claim 2, wherein the oil-containing meat-based products are selected from emulsion-type meat-based products, minced or coarsely comminuted meat-based products, pate and fresh (raw) sausages.

17. The method of claim 3, wherein the oil-containing meat-based products are selected from emulsion-type meat-based products, minced or coarsely comminuted meat-based products, pate and fresh (raw) sausages.

18. An oil-containing meat-based product, obtained according to the method of claim 2.

19. An oil-containing meat-based product, obtained according to the method of claim 3.

* * * * *